United States Patent [19]

Evans et al.

[11] Patent Number: 5,146,564
[45] Date of Patent: Sep. 8, 1992

[54] INTERFACE BETWEEN A SYSTEM CONTROL UNIT AND A SERVICE PROCESSING UNIT OF A DIGITAL COMPUTER

[75] Inventors: Michael B. Evans, Marlboro; Rueysen Lin, Lexington; Brian F. Rost, Northboro; R. Stephen Polzin, Holden, all of Mass.

[73] Assignee: Digital Equipment Corporation, Maynard, Mass.

[21] Appl. No.: 306,325

[22] Filed: Feb. 3, 1989

[51] Int. Cl.[5] ............................. G06F 13/00
[52] U.S. Cl. .................. 395/250; 364/DIG. 1; 364/239.6; 364/239; 364/239.1; 364/238.6; 364/240.8; 364/240.9
[58] Field of Search ... 364/200 MS File, 900 MS File; 395/250, 325, 550, 725

[56] References Cited

U.S. PATENT DOCUMENTS

| | | | |
|---|---|---|---|
| 4,451,886 | 5/1984 | Guest et al. | 364/200 |
| 4,500,958 | 2/1985 | Manton et al. | 364/200 |
| 4,521,882 | 6/1985 | Gabrielli et al. | 370/85 |
| 4,543,628 | 9/1985 | Pomfret | 364/200 |
| 4,725,396 | 1/1988 | Murphy et al. | 364/200 |
| 4,730,308 | 3/1988 | Friedman et al. | 370/85 |
| 4,740,958 | 4/1988 | Duxbury et al. | 370/94 |
| 4,779,267 | 10/1988 | Limb | 370/94 |
| 4,799,215 | 1/1989 | Suzuki | 370/60 |
| 4,807,109 | 2/1989 | Farrell et al. | 364/200 |
| 4,823,312 | 4/1989 | Michael et al. | 364/900 |
| 4,845,710 | 7/1989 | Nakamura et al. | 370/58.1 |

FOREIGN PATENT DOCUMENTS 0165914 12/1985 European Pat. Off. .
0217486 4/1987 European Pat. Off. .
0262429 4/1988 European Pat. Off. .

OTHER PUBLICATIONS

Fossum, Tryggve, James B. McElroy, William English, "An Overview of the VAX 8600 System", Digital Technical Journal, No. 1, Aug. 1985.

Primary Examiner—Kevin A. Kriess
Attorney, Agent, or Firm—Arnold, White & Durkee

[57] ABSTRACT

A computer system includes a plurality of central processing units (CPUs), a main memory, a system control unit (SCU) for controlling the transfer of data between the CPUs and the main memory, and a service processing unit (SPU) to interface the computer system with the outside world, such as an operator console. The method used for interfacing the SPU and SCU includes delivering a BUFFER FULL handshaking signal from the SPU to the SCU in response to the SPU receive buffer having data contained therein and being unavailable to receive data. The SCU responds to the absence of the BUFFER FULL handshaking signal by delivering a TRANSMIT FRAME handshaking signal to the SCU. A preselected duration of time after delivering the transmit frame, the SCU delivers the actual data in a series of fourteen consecutive clock cycles. Further, the method for delivering data from the transmit buffer of the SPU to a receive buffer of the SCU includes delivering a BUFFER REQUEST handshaking signal from the SPU to the SCU in order to determine if a buffer is currently available in the SCU. When a receive buffer grant becomes available in the SCU, a buffer grant handshaking signal is delivered to the SPU. The SPU responds by delivering the actual data in fourteen consecutive clock cycles.

5 Claims, 6 Drawing Sheets

INTERFACE BETWEEN A SYSTEM CONTROL UNIT AND A SERVICE PROCESSING UNIT OF A DIGITAL COMPUTER

RELATED APPLICATIONS

The present application discloses certain aspects of a computing system that is further described in the following U.S. patent applications filed concurrently with the present application: Arnold et al., METHOD AND APPARATUS FOR INTERFACING A SYSTEM CONTROL UNIT FOR A MULTIPROCESSOR SYSTEM WITH THE CENTRAL PROCESSING UNITS, Ser. No. 07/306,837 filed Feb. 3, 1989; Gagliardo et al., METHOD AND MEANS FOR INTERFACING A SYSTEM CONTROL UNIT FOR A MULTI-PROCESSOR SYSTEM WITH THE SYSTEM MAIN MEMORY, Ser. No. 07/306,326 filed Feb. 3, 1989, abandoned, continued in Ser. No. 07/646,522 filed Jan. 28, 1991; D. Fite et al., METHOD AND APPARATUS FOR RESOLVING A VARIABLE NUMBER OF POTENTIAL MEMORY ACCESS CONFLICTS IN A PIPELINED COMPUTER SYSTEM, Ser. No. 07/306,767 filed Feb. 3, 1989; D. Fite et al., DECODING MULTIPLE SPECIFIERS IN A VARIABLE LENGTH INSTRUCTION ARCHITECTURE, Ser. No. 07/307,347 filed Feb. 3, 1989; D. Fite et al., VIRTUAL INSTRUCTION CACHE REFILL ALGORITHM, Ser. No. 07/306,831 filed Feb. 3, 1989; Murray et al., PIPELINE PROCESSING OF REGISTER AND REGISTER MODIFYING SPECIFIERS WITHIN THE SAME INSTRUCTION, Ser. No. 07/306,833 filed Feb. 3, 1989; Murray et al., MULTIPLE INSTRUCTION PREPROCESSING SYSTEM WITH DATA DEPENDENCY RESOLUTION FOR DIGITAL COMPUTERS, Ser. No. 07/306,773 filed Feb. 3, 1989; Murray et al., PREPROCESSING IMPLIED SPECIFIERS IN A PIPELINED PROCESSOR, Ser. No. 07/306,846 filed Feb. 3, 1989; D. Fite et al., BRANCH PREDICTION, Ser. No. 07/306,760 filed Feb. 3, 1989; Fossum et al., PIPELINED FLOATING POINT ADDER FOR DIGITAL COMPUTER, Ser. No. 07/306,343 filed Feb. 3, 1989, and issued as U.S. Pat. No. 4,994,996 on Feb. 19, 1991; Grundmann et al., SELF TIMED REGISTER FILE, Ser. No. 07/306,445 filed Feb. 3, 1989, now U.S. Pat. No. 5,107,462; Beaven et. al., METHOD AND APPARATUS FOR DETECTING AND CORRECTING ERRORS IN A PIPELINED COMPUTER SYSTEM, Ser. No. 07/306,828 filed Feb. 3, 1989 and issued as U.S. Pat. No. 4,982,402 on Jan. 1, 1991; Flynn et al., METHOD AND MEANS FOR ARBITRATING COMMUNICATION REQUESTS USING A SYSTEM CONTROL UNIT IN A MULTI-PROCESSOR SYSTEM, Ser. No. 07/306,871 filed Feb. 3, 1989; E. Fite et al. CONTROL OF MULTIPLE FUNCTION UNITS WITH PARALLEL OPERATION IN A MICROCODED EXECUTION UNIT, Ser. No. 07/306,832 filed Feb. 3, 1989, now U.S. Pat. No. 5,067,069; Webb, Jr. et al., PROCESSING OF MEMORY ACCESS EXCEPTIONS WITH PREFETCHED INSTRUCTIONS WITHIN THE INSTRUCTION PIPELINE OF A VIRTUAL MEMORY SYSTEM-BASED DIGITAL COMPUTER, Ser. No. 07/306,866 filed Feb. 3, 1989, and issued as U.S. Pat. No. 4,895,825 on Jan. 15, 1991; Hetherington et al., METHOD AND APPARATUS FOR CONTROLLING THE CONVERSION F VIRTUAL TO PHYSICAL MEMORY ADDRESSES IN A DIGITAL COMPUTER SYSTEM, Ser. No. 07/306,544 filed Feb. 3, 1989; Hetherington, WRITE BACK BUFFER WITH ERROR CORRECTING CAPABILITIES, Ser. No. 07/306,703 filed Feb. 3, 1989, and issued as U.S. Pat. No. 4,995,041 on Feb. 19, 1991; Flynn et al., METHOD AND MEANS FOR ARBITRATING COMMUNICATION REQUESTS USING A SYSTEM CONTROL UNIT IN A MULTI-PROCESSOR SYSTEM, Ser. No. 07/306,871 filed Feb. 3, 1989; Chinnasway et al., MODULAR CROSSBAR INTERCONNECTION NETWORK FOR DATA TRANSACTIONS BETWEEN SYSTEM UNITS IN A MULTI-PROCESSOR SYSTEM, Ser. No. 07/306,336 filed Feb. 3, 1989, and issued as U.S. Pat. No. 4,968,977 on Nov. 6, 1990; Polzin et al., METHOD AND APPARATUS FOR INTERFACING A SYSTEM CONTROL UNIT FOR A MULTI-PROCESSOR SYSTEM WITH INPUT/OUTPUT UNITS, Ser. No. 07/306,862 filed Feb. 3, 1989, and issued as U.S. Pat. No. 4,965,793 on Oct. 23, 1990; Gagliardo et al., MEMORY CONFIGURATION FOR USE WITH MEANS FOR INTERFACING A SYSTEM CONTROL UNIT FOR A MULTI-PROCESSOR SYSTEM WITH THE SYSTEM MAIN MEMORY, Ser. No. 07/306,404 filed Feb. 3, 1989, now U.S. Pat. No. 5,043,874; and Gagliardo et al., METHOD AND MEANS FOR ERROR CHECKING OF DRAM-CONTROL SIGNALS BETWEEN SYSTEM MODULES, Ser. No. 07/306,836 filed Feb. 3, 1989, abandoned, continued in Ser. No. 07/582,493 filed Sep. 14, 1990.

TECHNICAL FIELD

This invention relates generally to an interface between functional components of a computer system and, more particularly, to an interface between a system control unit of a multiprocessor computer system and an associated service processing unit.

DESCRIPTION OF RELATED ART

In the field of computer systems, it is common practice for the operation of the computer to be monitored and controlled by an operator working at an operators console. To effect proper control over the computer system, the operator must have the ability to access the system main memory, I/O, and be able to interrupt the operation of any selected CPU. Further, operators access to the memory and I/O units is of particular importance during a system error. In order to determine the cause of the system error, the operator must have access to the memory and I/O units so that they may be examined and the error determined.

A system control unit (SCU) is employed to manage all inter unit communications. The SCU links multiple CPUs to the main memory and to the I/O through a series of independent interfaces. Similarly the SCU is also linked to the operator console through an interface that must be capable of efficiently and reliably handling the data transfers therebetween. The reliability of this interface is of particular importance to ensure that when the operator is determining the cause of a system error, he does not have to contend with additional errors introduced by the interface.

SUMMARY OF THE INVENTION

To provide an efficient, reliable interface between a system control unit and a service processing unit, the flow of data between a receive buffer of the system control unit and a transmit buffer of the service processing unit is controlled by: delivering a buffer request handshaking signal from the service processing unit to the system control unit; delivering a buffer grant handshaking signal from the system control unit to the service processing unit in response to receiving the buffer request handshaking signal and the system control unit receive buffer being available to receive data; and delivering the data from the service processing unit transmit buffer to the system control unit receive buffer in a series of consecutive clock cycles.

In a second aspect of the present invention, the flow of data between a receive buffer of a service processing unit and a transmit buffer of a system control unit is controlled by: delivering a buffer full handshaking signal from the service processing unit to the system control unit in response to the service processing unit receive buffer having data contained therein and being unavailable to receive data; delivering a transmit frame handshaking signal from the system control unit to the service processing unit in response to the absence of the buffer full handshaking signal; and delivering the data from the system control unit transmit buffer to the service processing unit receive buffer in a series of consecutive clock cycles.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Figure 1:
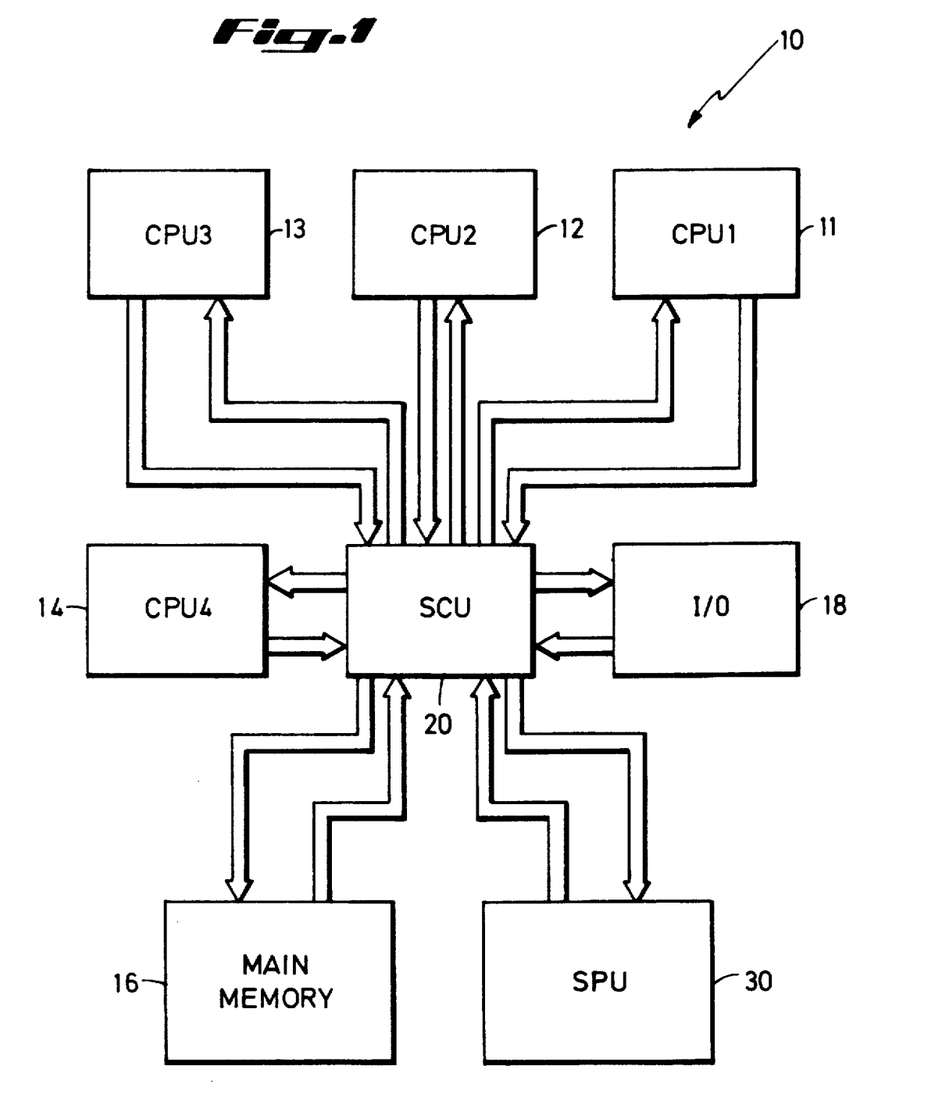
FIG. 1 is a top level diagram of a computer system.

Turning now to the drawings and referring first to FIG. 1, there is shown a top level block diagram of a multiprocessing computer system 10 which includes a plurality of central processing units (CPU1-CPU4) 11, 12, 13, 14. The CPUs require access to a shared common main memory 16, as well as, input/output units (I/O) 18. The I/O 18 allows the computer system 10, in general, and the CPUs, in particular, to communicate with the external world. For example, the I/O 18 includes such well known devices as disc and tape drives, communication devices, printers, plotters, workstations, etc.

To take full advantage of the multiple CPUs, the system is configured to allow CPU1-CPU4 to operate in parallel. This parallel operation presents some problems in the form of access conflicts to the shared memory 16 and I/O 18. A system control unit (SCU) 20 is employed to manage these inter-unit communications. The SCU 20 links CPU1-CPU4 to the main memory 16 and to the I/O 18 through a series of independent interfaces. Data requests are received by the SCU 20 from each of the units which, owing to the parallel nature of the CPU operation, occur at unscheduled times, and in particular, at the same time. These requests for data transfer are scheduled according to an arbitration algorithm and processed through the appropriate interface to/from the identified unit.

Inside the CPUs, the execution of an individual instruction is broken down into multiple smaller tasks These tasks are performed by dedicated, separate, independent functional units that are optimized for that purpose.

Although each instruction ultimately performs a different operation, many of the smaller tasks into which each instruction is broken are common to all instructions. Generally, the following steps are performed during the execution of an instruction: instruction fetch, instruction decode, operand fetch, execution, and result store. Thus by the use of dedicated hardware stages, the steps can be overlapped, thereby increasing the total instruction throughput.

The data path through the pipeline includes a respective set of registers for transferring the results of each pipeline stage to the next pipeline stage. These transfer registers are clocked in response to a common system clock. For example, during a first clock cycle, the first instruction is fetched by hardware dedicated to instruction fetch. During the second clock cycle, the fetched instruction is transferred and decoded by instruction decode hardware, but, at the same time, the next instruction is fetched by the instruction fetch hardware. During the third clock cycle, each instruction is shifted to the next stage of the pipeline and a new instruction is fetched. Thus, after the pipeline is filled, an instruction will be completely executed at the end of each clock cycle.

This process is analogous to an assembly line in a manufacturing environment. Each worker is dedicated to performing a single task on every product that passes through his or her work stage. As each task is performed the product moves closer to completion. At the final stage, each time the worker performs his assigned task a completed product rolls of the assembly line.

To accomplish this pipelining of instructions, the CPUs are partitioned into at least three functional units: an execution unit, an instruction unit, and a memory access unit. As its name suggests, the execution unit is ultimately responsible for the actual execution of the instructions. The instruction unit prefetches instructions, decodes opcodes to obtain operand and result specifiers, fetches operands, and updates the program counter.

The memory access unit performs the memory related functions of the CPU. For example, the memory access unit maintains a high-speed cache. The cache stores a copy of a small portion of the information stored in main memory 16 and is employed to increase processing speed by reducing memory access time. The main memory 16 is constructed of lower cost and slower memory components. If the CPU were required to access main memory 16 during each memory reference, the overall speed of the CPU would be reduced to match the main memory speed since the CPU could not execute the instruction until the memory reference had returned the desired data. Accordingly, the cache is constructed of high-speed, high-cost semiconductor memory components, but owing to its high cost, the cache contains considerably fewer storage locations than does main memory. These relatively few high-speed storage locations are used to maintain that portion of main memory which will be most frequently used by the CPU. Therefore, only those memory references which are not maintained in the cache result in access to the main memory 16. Thus, the overall speed of the CPU is improved.

It should be noted that the memory maintained in the cache changes as the program proceeds. For example, the memory locations which are frequently referenced at the beginning of the program may not be accessed in later stages of the program. Conversely, memory locations used frequently by the middle portion of the program may be of little use to the beginning or ending portions of the program. Thus, it can be seen that the contents of the cache needs frequent updates from the main memory 16 and there is a need for efficient communication between the cache and the SCU 20.

The SCU 20 also links the various system units to a service processor unit (SPU) 30 which performs traditional console functions. The SPU 30 has responsibility for status determination and control of the overall operation of the processing system. In particular, the SCU 20 provides the SPU 30 with means for communicating with the plurality of CPUs and provides access to all storage elements within the CPUs. The SPU 30 initiates memory access functions, including reads and writes, as well as, I/O reads and writes. Further, the SPU is also capable of initiating interrupts to any or all of the CPUs.

Efficient communication between all system units ported into the SCU 20 is critical to optimize parallel operation of the computer system 10. I/O can reference memory, the CPUs can reference memory, and the CPUs can reference I/O, but the bulk of the traffic is between the CPUs and the memory. The SCU 20 is the central switching station for all of the message packets throughout the system.

Efficient communication between the SPU and the SCU is similarly critical. System operators working at control consoles, interact with the computer system through the SPU to SCU interface. Thus, to ensure that these operators have reliable, fast access to the CPUs, I/O, and main memory, proper operation of the interface is crucial.

Figure 2:
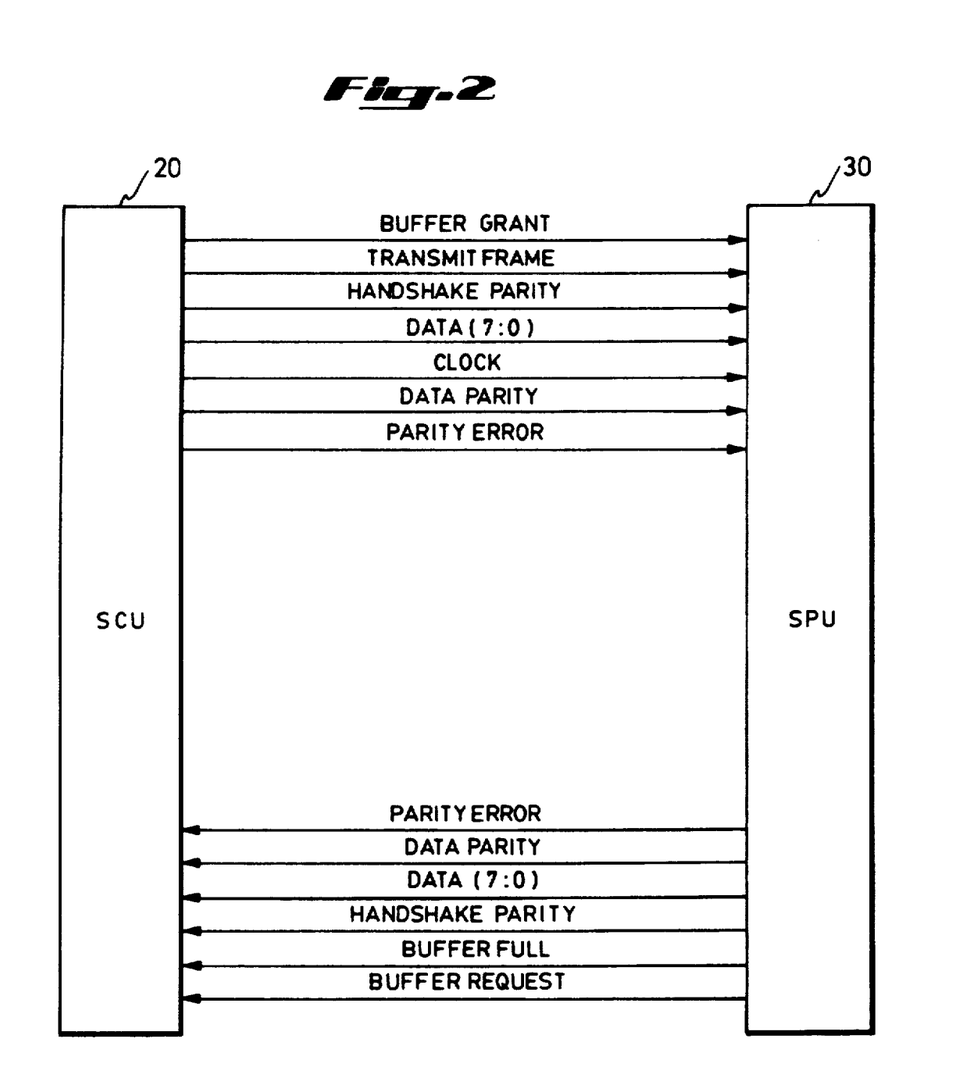
FIG. 2 is a general block diagram of the system control unit to, service processing unit interface.

Referring now to FIG. 2, the interface between the SCU 20 and the SPU 30 and the corresponding interface signals are shown. It should be noted that while each of the signals is represented by a single line, the signals are actually transmitted as differential pairs to reduce noise coupling. Further, because the interface employs series terminated emitter coupled logic, none of the lines are bidirectional. The interface includes separate lines in each direction for transmitting the same type of signals. For example, the interface includes eight lines for transmitting data from the SPU to the SCU and eight lines for transmitting data from the SCU to the SPU. Each set of these eight lines allows a full byte of data (8 bits) to be transmitted in a single clock cycle. Also, the data lines are represented by the vector notation [7:0], indicating that the single line represents eight parallel data lines.

While these eight lines are generally referred to as data lines, this is for purposes of convenience only. In addition to providing a data path between the SCU and SPU, the data lines are also capable of delivering the address for memory and I/O reads and writes. Further, the data lines can also imbed, within a packet transfer, a command field, as well as, a mask field for data writes. Finally, the data lines can also carry interrupts from the SPU to the SCU and error correction codes therebetween.

The data bus, being only 8-bits wide, can, of course, only transfer a single byte of information within a single clock cycle. However, a data transfer typically involves a quadword of data (8-bytes). Thus, in order to transfer a quadword of data over the 8-bit data bus, one byte of data is transmitted during each clock cycle for eight consecutive clock cycles. Further, since the address is also delivered over this same 8-bit bus and the addressable memory for the instant computer system requires 32-bits to define the complete memory area, the address must be delivered in four consecutive clock cycles. Additionally, the command signal is similarly delivered over this same 8-bit bus, requiring an additional clock cycle to complete the data transfer. Likewise, for write operations from the SPU to the SCU an 8-bit mask field is required to identify those bytes which are valid bytes to be written. Accordingly, a complete transfer of data between the SPU and SCU requires a total of fourteen clock cycles.

The interface configures a memory read/write operation into a fourteen clock cycle packet consisting of the address, data, command, and mask bits arranged according to TABLE I.

TABLE I

| MEMORY READ/WRITE PACKET | | |
|---|---|---|
| clock cycle | bits 7:4 | bits 3:0 |
| 0 | don't care | cmd[3:0] |
| 1 | addr[29:26] | addr[13:10] |
| 2 | addr[5:2] | addr[9:6] |
| 3 | addr[33:30] | addr[21:18] |
| 4 | addr[25:22] | addr[17:14] |
| 5 | mask[7:4] | mask[3:0] |
| 6 | data[35:32] | data[3:0] |
| 7 | data[39:36] | data[7:4] |
| 8 | data[43:40] | data[11:8] |
| 9 | data[47:44] | data[15:12] |
| 10 | data[51:48] | data[19:16] |
| 11 | data[55:52] | data[23:20] |
| 12 | data[59:56] | data[27:24] |
| 13 | data[63:60] | data[31:28] |

In a memory read-write operation, the data bus is cycled fourteen times, beginning at cycle 0 with the upper 4-bits unspecified and the lower 4-bits containing a 4-bit command field. Thereafter, in cycle 1, transmission of the 32-bit address is begun by delivering bits 29:26 and 13:10. The information contained in the remaining twelve cycles are evident from an examination of TABLE I.

As discussed previously, in addition to memory read and write operations, the interface also performs I/O read and write operations. Like the memory packet transfer, the I/O transfer is also accomplished in fourteen clock cycles. The organization of the transfer packet is altered over that shown in TABLE I and corresponds to the format shown in TABLE II.

TABLE II

| | I/O READ/WRITE PACKET | |
|---|---|---|
| clock cycle | bits 7:4 | bits 3:0 |
| 0 | don't care | cmd[3:0] |
| 1 | addr[29:26] | addr[13:10] |
| 2 | addr[5:2] | addr[9:6] |
| 3 | addr/mask[33:30] | addr[21:18] |
| 4 | addr[25:22] | addr[17:14] |
| 5 | must be zero | must be zero |
| 6 | don't care | data[3:0] |
| 7 | don't care | data[7:4] |
| 8 | don't care | data[11:8] |
| 9 | don't care | data[15:12] |
| 10 | don't care | data[19:16] |
| 11 | don't care | data[23:20] |
| 12 | don't care | data[27:24] |
| 13 | don't care | data[31:28] |

TABLES III and IV respectively represent the organization of an error correction code (ECC) packet transfer and an interrupt command packet transfer.

TABLE III

| | ECC COMMAND PACKET | |
|---|---|---|
| clock cycle | bits 7:4 | bits 3:0 |
| 0 | don't care | cmd[3:0] |
| 1 | addr[29:26] | addr[13:10] |
| 2 | addr[5:2] | addr[9:6] |
| 3 | addr[33:30] | addr[21:18] |
| 4 | addr[25:22] | addr[17:14] |
| 5 | don't care | don't care |
| 6 | addr[29:26] | addr[13:10] |
| 7 | addr[5:2] | addr[9:6] |
| 8 | addr[33:30] | addr[21:18] |
| 9 | addr[25:22] | addr[17:14] |
| 10 | mdp1syn[7:4] | mdp0syn[7:4] |
| 11 | mdp1syn[3:0] | mdp0syn[3:0] |
| 12 | mdp1syn[15:12] | mdp0syn[15:12] |
| 13 | mdp1syn[11:8] | mdp0syn[11:8] |

The address field of the ECC command packet contains the high order 32-bits of the 34-bit address where an ECC error was detected. The syndrome field contains the 32 bit error syndrome for the failed address. This error syndrome allows the SPU to perform double bit detection and single bit correction on data that was previously transferred over the SCU to SPU interface and received a bit error.

TABLE IV

| | INTERRUPT COMMAND PACKET | |
|---|---|---|
| clock cycle | bits 7:4 | bits 3:0 |
| 0 | ID[3:0] | cmd[3:0] |
| 1 | don't care | don't care |
| 2 | don't care | don't care |
| 3 | don't care | don't care |
| 4 | don't care | don't care |
| 5 | don't care | don't care |
| 6 | don't care | don't care |
| 7 | don't care | don't care |
| 8 | don't care | don't care |
| 9 | don't care | don't care |
| 10 | don't care | don't care |
| 11 | don't care | don't care |

TABLE IV-continued

| | INTERRUPT COMMAND PACKET | |
|---|---|---|
| clock cycle | bits 7:4 | bits 3:0 |
| 12 | don't care | don't care |
| 13 | don't care | don't care |

Within the interrupt command packet, the 4-bit ID field indicates which of the four CPUs is to be interrupted upon receipt of this packet. Bit 4 corresponds to CPU0, bit 5 corresponds to CPU1, bit 6 corresponds to CPU2, and bit 7 corresponds to CUP3. If, for example, the data presented at bits 7:4 of clock cyclo 0 is 0001, then CPUO is to be interrupted according to the command field.

Within the four tables, the command field is consistently shown as a 4-bit field transmitted as the lower 4-bits in the 0 clock cycle. Depending upon the direction of the transfer, the command field codes assume different definitions. Command code transmitted from the SPU to the SCU performs a different function than the same code transmitted from the SCU to the SPU. For example, the command field definitions for an SCU to SPU transfer are represented in TABLE V.

TABLE V

| SCU to SPU COMMANDS | |
|---|---|
| code | command |
| 0000 | READ REGISTER |
| 0001 | WRITE REGISTER |
| 0010 | RETURN MEMORY READ |
| 0011 | RETURN I/O READ |
| 0100 | RETURN READ ERROR |
| 0101 | WRITE ERROR REGISTER |
| 0110 | READ LOCK DENIED |

READ REGISTER is a command issued by the SCU when it desires to read a console register that is physically located in the console subsystem. This command uses the I/O read/write packet format shown in TABLE II.

WRITE REGISTER is a command issued by the SCU when the SCU wishes to write to a console register that is physically located in the console subsystem. Like the READ REGISTER command the I/O read write packet format shown in TABLE II is used.

RETURN MEMORY READ is a command issued by the SCU when the SCU returns read data that was requested via a previous read request that referenced memory space. This command uses the memory packet format shown in TABLE I.

RETURN I/O READ is a command issued by the SCU similar to the RETURN MEMORY READ except that the data request referenced I/O space rather than memory space. This command uses the I/O read write packet format shown in TABLE II.

RETURN READ ERROR is a command issued by the SCU to notify the SPU that read data that was requested via a previous read request encountered an error condition. This command is valid whether the previous read request referenced I/O or memory. An error condition can result, for example, from a reference to a memory location that does not exist. This command uses the memory packet format shown in TABLE I.

WRITE ERROR REGISTER is a command issued by the SCU to report an ECC incident to the SPU. This command used the ECC command packet format shown in TABLE III to return the address where the error was detected and a syndrome for correcting the error.

READ LOCK DENIED is a command issued by the SCU to notify the SPU that a read lock request that referenced memory spaced encountered an existing lock. Thus, the requested data will not be returned. This command uses the memory packet format shown in TABLE I.

Alternatively, the command field definitions for an SPU to SCU transfer are represented in TABLE VI.

TABLE VI

| code | SPU to SCU COMMANDS |
|---|---|
| | command |
| 0000 | MEMORY READ REQUEST |
| 0001 | MEMORY WRITE |
| 0010 | MEMORY READ LOCK REQUEST |
| 0011 | MEMORY WRITE UNLOCK |
| 0100 | I/O READ REQUEST |
| 0101 | I/O WRITE |
| 0110 | REGISTER RETURN READ |
| 0111 | INTERRUPT TRX |
| 1000 | INTERRUPT TTX |
| 1001 | INTERRUPT SRX |
| 1010 | INTERRUPT STX |
| 1011 | INTERUPT PF |
| 1100 | CONSOLE HALT |
| 1101 | KEEP ALIVE |
| 1110 | CONSOLE SPARE INTERRUPT |
| 1111 | CONSOLE SPARE INTERRUPT |

MEMORY READ REQUEST is a command issued by the SPU to retrieve data from a valid memory address in main memory. This command uses the memory packet format shown in TABLE I.

MEMORY WRITE is a command issued by the SPU to write data to a valid memory address in main memory. This command uses the memory packet format shown in TABLE I.

MEMORY READ LOCK REQUEST is a command issued by the SPU to read lock a valid memory address. This command uses the memory packet format shown in TABLE I.

MEMORY WRITE UNLOCK is a command issued by the SPU to write unlock a valid memory address in main memory. This command uses the memory packet format shown in TABLE I.

I/O READ REQUEST is a command issued by the SPU to read a valid I/O address. This command uses the I/O read write packet format shown in TABLE II.

I/O WRITE is a command issued by the SPU to write data to a valid I/O address. This command uses the I/O read write packet format shown in TABLE II.

REGISTER RETURN READ is a command issued by the SPU when the SPU is responding to a previous READ REGISTER REQUEST from the SCU. The SPU issues this command and presents the requested data using the I/O read write packet format shown in TABLE II.

INTERRUPT TRX is a command issued by the SPU to interrupt one or more selected CPUs in response to a console terminal receive. This command uses the interrupt packet format shown in TABLE IV.

INTERRUPT TTX is a command issued by the SPU to interrupt one or more selected CPUs in response to a console terminal transmit. This command uses the interrupt packet format shown in TABLE IV.

INTERRUPT SRX is a command issued by the SPU to interrupt one or more selected CPUs in response to a console storage receive. This command uses the interrupt packet format shown in TABLE IV.

INTERRUPT STX is a command issued by the SPU to interrupt one or more selected CPUs in response to a console storage transmit. This command uses the interrupt packet format shown in TABLE IV.

INTERRUPT PF is a command issued by the SPU to interrupt one or more selected CPUs in response to an impending power failure. This command uses the interrupt packet format shown in TABLE IV.

CONSOLE HALT is a command issued by the SPU to interrupt one or more selected CPUs to halt the operation of that CPU. This command uses the interrupt packet format shown in TABLE IV.

KEEP ALIVE is a command issued by the SPU to interrupt one or more selected CPUs to prevent a "keep alive" time out from occurring This command uses the interrupt packet format shown in TABLE IV.

The remaining command codes 1110 and 1111 are available for use as console interrupt commands.

Referring once again to FIG. 2, in addition to the eight parallel data lines, the interface includes a single data parity line for each group of eight data lines transferred in each direction. The data parity is odd and is synchronously read along with each byte of data. Thus, the 14-byte transfer results in fourteen data parity bits being sampled, one at each clock cycle.

In order to synchronize the operation of the SCU and SPU, a common clock signal is used. Preferably, the SCU clock signal is delivered over the interface to synchronize all data transfers therebetween.

Both the SPU and the SCU possess three handshaking signals to facilitate the transfer of data between the units. In order to reduce the possibility of delivering data to a unit that is unprepared to receive that data, handshaking communication between the two units is implemented. Accordingly, each unit has three handshaking signals and a parity signal on their three handshaking signals. For example, the SPU includes a 14-byte buffer for receiving and temporarily storing a 14-byte data transfer. Until the SPU can assimilate the data in this buffer, it cannot receive additional data transfers. Accordingly, the SPU asserts its BUFFER FULL handshaking signal as long as its buffer remains full and unavailable for further data. The SCU monitors the BUFFER FULL signal and does not initiate additional data transfer until the BUFFER FULL signal is deasserted. Once the SPU buffer becomes available, the SCU asserts a TRANSMIT FRAME handshaking signal to advise the SPU that, for the next fourteen clock cycles, valid data will be present on the SCU to SPU data lines.

Data transfers in the opposite direction, from the SPU to the SCU, are similarly effected. When the SPU is prepared to transmit data to the SCU, the SPU generates a BUFFER REQUEST handshaking signal which the SCU ultimately responds to by delivering its BUFFER GRANT handshaking signal. This BUFFER GRANT signal is only delivered when the SCU has freed its 14-byte input buffer to receive data from the SPU.

The single line handshaking parity signals delivered by both the SPU and SCU are generated synchronously with each individual handshaking signal. Without these parity signals the risk of erroneous data transfer is increased. By providing the odd parity signal with each handshaking signal, the reliability of data transfer is greatly enhanced.

Figure 3:
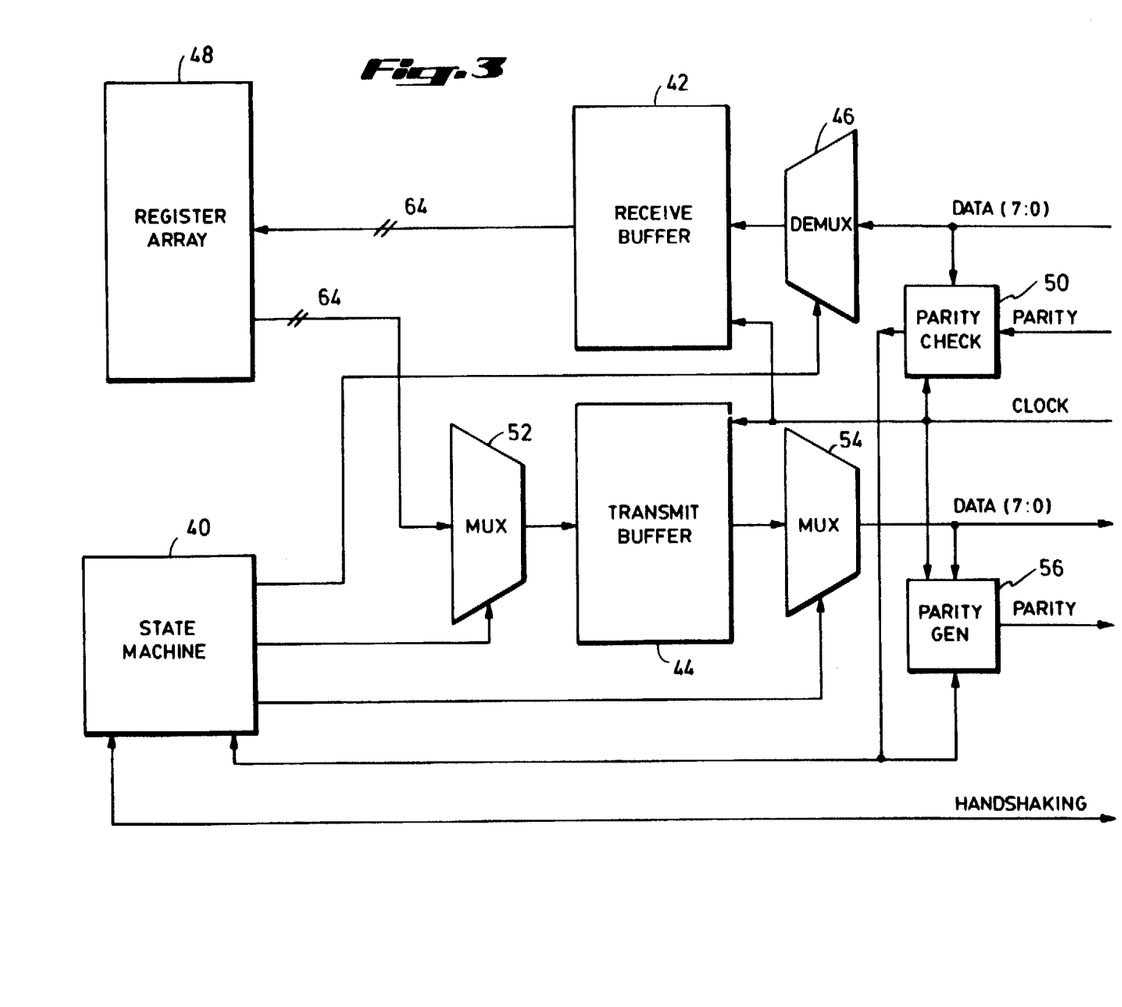
FIG. 3 is a top level block diagram of the service processing unit portion of the service processing unit to system control unit interface.

Referring now to FIG. 3, a top level block diagram of the SPU portion of the SPU to SCU interface is shown. A control state machine 40 effects overall control of the SPU portion of the interface. A 14×8 receive and transmit buffer 42, 44 are respectively connected to receive the 14-byte data transfer from the SCU and to transmit the 14-byte data transfer to the SCU. The 8-bit data input lines are connected through a demultiplexer 46 to the receive buffer 42. The select lines to the demultiplexer 46 are controlled by the state machine 40 to increment through byte locations 0–13 on corresponding clock cycles 0–13. In this manner the fourteen buffer locations are consecutively filled with the 14-bytes of data.

The outputs of the receive buffer 42 are connected to an array of 64-bit registers 48 that, depending upon the value of the command code, receive the actual data bits 0:63. The command that the SCU intends for the SPU to execute ultimately determines which of the registers in the array of registers 48 is loaded with the data bits.

As each byte of data is received from the SCU, it is not only delivered to the receive buffer 42, but it is also routed to parity checking hardware 50 that combines the 8-bit data signal and the data parity signal to determine if any errors occurred during the transmission. The results of the parity checking hardware 50 is communicated to the state machine 40. A parity error causes the state machine 40 to generate the parity error handshaking signal.

The transmit buffer 44 is connected to the array of registers 48 through a multiplexer 52. The select inputs to the multiplexer 52 are controlled by the state machine 40 to select one of the array of registers 48. Which register is selected is a function of the operation desired by the SPU. Thus, the SPU initiates the data transfer by delivering a control signal to the state machine 40 indicating which register to select via the multiplexer 52.

This loading of the transmit buffer 44 under control of the state machine 40 does not result in the transmit buffer 44 being immediately delivered to the SCU. Rather, the state machine 40 initiates the actual data transfer to the SCU only in response to receiving the BUFFER GRANT handshaking signal from the SCU. In the clock cycle immediately following the BUFFER GRANT signal, the state machine 40 begins producing sequential control signals 0–13 during the next 14 clock cycles. These sequential signals are delivered to the select input of a multiplexer 54 so that the transmit buffer is sequentially unloaded over the next fourteen clock cycles.

In addition to each byte of data being delivered to the SCU, the data is also delivered to parity signal generating logic 56. The parity logic 56 produces the data parity signal that is delivered to the SCU synchronously with the corresponding byte of data.

As discussed previously, data transfer between the SPU and the SCU is synchronized on the SCU clock signal. Accordingly, the SCU clock signal is delivered over the interface and connected to the clock inputs of the receive and transmit buffers 42, 44 and parity logic 50, 56.

Figure 4:
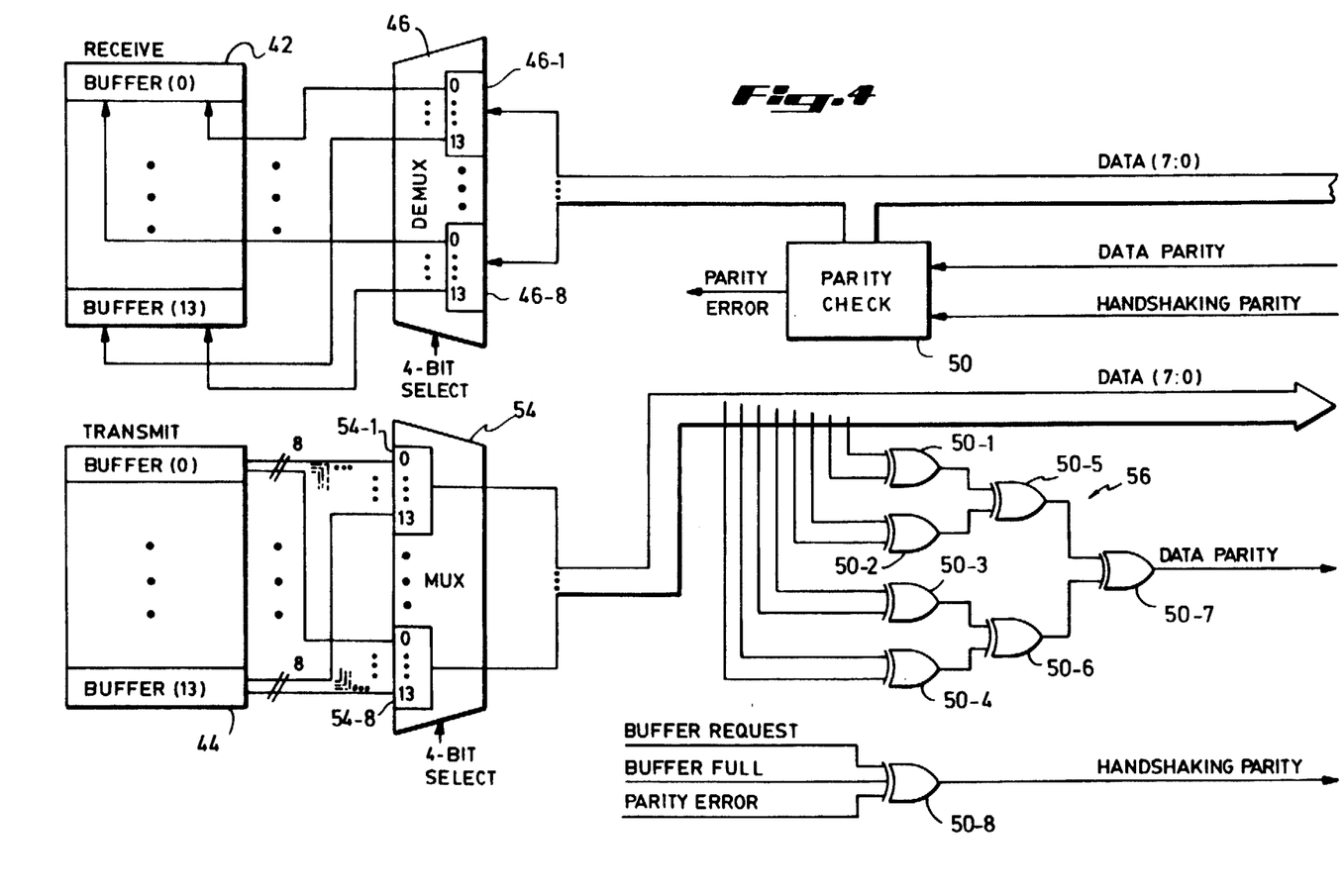
FIG. 4 is a detailed block diagram of the service processing unit, portion of the service processing unit to system control unit interface.

Referring now to FIG. 4, a detailed block diagram of the SPU portion of the SPU to SCU interface is shown. The transmit buffer 44 has fourteen 8-bit lines all connected to a multiplexer 54. (The number of bits, carried by respective parallel conductors of a line, are indicated by the numeral 8 next to the double slash symbol "//" intersecting the line.) The multiplexer 54 includes eight 14:1 multiplexers 54-1 through 54-8. The multiplexer 54-1 receives the zero bit input from each of the fourteen buffers. Similarly, multiplexers 54-2 through 54-8 respectively receive bits 1 through 7 of each of the buffers 1 through 13.

The state machine 40 has a 4-bit input line connected to the select input of each of the multiplexers 54-1 through 54-8. In this manner, the state machine 40 is able to select all eight bits of any of the fourteen buffers. For example, to deliver the contents of buffer(1), the state machine 40 delivers the 4-bit signal 0001. The select inputs for each of the multiplexers 54-1 through 54-8 deliver their input line 1, which corresponds to bits 0 through 8 of buffer(1). Therefore, in order for the state machine 40 to consecutively deliver each of the fourteen 8-bit buffers, the select addresses 0000 through 1110 are consecutively delivered in fourteen clock cycles to sequentially deliver the contents of buffer(0) through buffer(13).

The single bit output of each of the multiplexers 54-1 through 54-8 are ganged together and form the 8-bit data signal delivered to the SPU.

As discussed in FIG. 3, this 8-bit data signal is also delivered to the parity generating logic 56. This parity generating logic 56 includes an array of XOR gates to provide a signal that ensures that the number of data bits that are asserted in combination with the parity output signal constitutes an odd number. For example, an 8-bit data signal of 00000011 has an even number of asserted bits (2). Therefore, the parity bit must also be asserted so that an odd number of bits are asserted (3).

This array of XOR gates includes four 2-input XOR gates 50-1 through 50-4 connected to the eight data lines. The outputs of XOR gates 50-1, 50-2 are connected to the inputs of a XOR gate 50-5. Similarly, the outputs of XOR gates 50-3, 50-4 are connected to the inputs of a XOR gate 50-6. The outputs of the two XOR gates 50-5, 50-6 are connected to the two inputs of XOR gate 50-7, which outputs the data parity signal. In this manner, an odd number of asserted data bits results in the data parity signal not being asserted.

Additionally, it should be remembered that a parity signal is also delivered with the three handshaking signals: BUFFER FULL; BUFFER REQUEST; and PARITY ERROR. Accordingly, the parity generating logic 50 also includes an XOR gate 50-8 which has three inputs connected to the three handshaking signals. Correspondingly, XOR gate 50-8 output is asserted when an even number of the handshaking signals are similarly asserted.

The receive buffer 42 is preferably capable of receiving the fourteen cycles of data and consecutively placing that data in each of its fourteen 1-byte buffers. In order to accomplish this, a demultiplexer 46 is disposed intermediate the data input and the fourteen 1-byte buffers. The demultiplexer 46 includes eight 1:14 demultiplexers 46-1 through 46-8.

The inputs to the demultiplexers 46-1 through 46-8 are data bits 0 through 7 respectively. The fourteen output lines from each of the demultiplexers 46-1 through 46-8 are connected to their corresponding bit position in the fourteen data buffers. For example, demultiplexer 46-1 receives data bit 0. The demultiplexer 46-1 output bits 0-13 are connected to the 0 bit position of buffer(0) through buffer(13) respectively. Similarly, demultiplexer 46-2 receives data bit(1). The demultiplexer 46-1 output bits 0 through 13 are connected to bit position 1 in each of the buffers 0 through 13 respectively.

The select lines to each of the demultiplexers 46-1 through 46-8 are connected to the state machine 40 through a 4-bit line. In this manner, the state machine 40 selects any one of the receive buffers 0–13 to receive the data currently on the data lines. For example, if the state machine 40 desires to load buffer(1) with the data currently present on the data lines, it delivers the 4-bit signal 0001 to the select inputs of the demultiplexers 46-1 through 46-8. This signal on the select lines causes the demultiplexers 46-1 through 46-8 to deliver their input on their output line 1, which is connected to bit position 1 of receive buffer(1).

The state machine 40, during normal operation, consecutively delivers select addresses 0000-1101 to the demultiplexer 46 in fourteen consecutive clock cycles. Thus, the data delivered by the SCU in these same fourteen consecutive clock cycles is loaded into receive buffers 0–13 respectively.

In addition to the data lines being connected to the demultiplexer 46, they are also delivered to the parity checking logic 50. This parity checking logic 50 is substantially similar to the parity generating logic 56. The parity checking logic 50 includes an array of exclusive XOR gates 56-1 through 56-8 that receive the eight data inputs and the data parity of the SCU. These inputs are consecutively combined in the two input exclusive XOR gates to arrive at a signal that is asserted when the number of data and the parity bits are odd and unasserted when the number of data bits asserted and the parity bit are even. When the signal is odd, it indicates that a parity error has occurred. This signal is transmitted to the state machine 40 so that the SPU will begin an error recovery process.

The SCU portion of the SPU to SCU interface is substantially similar in structure to the SPU portion of the interface. Accordingly, the hardware configuration of the SCU portion of the interface is not shown or discussed herein. The difference between the SPU and SCU interface portions lies in the functional implementation of the transfer protocol. This difference, however, is not related to hardware configuration, but is dependent upon the functional implementation of the state machines. Thus, the differences between the SPU and SCU interface portions are most evident and more easily described by flowcharts of procedures followed by the respective state machines. Flowcharts of the data transfer protocols are shown and discussed in conjunction with FIGS. 5 and 6.

Figure 5:
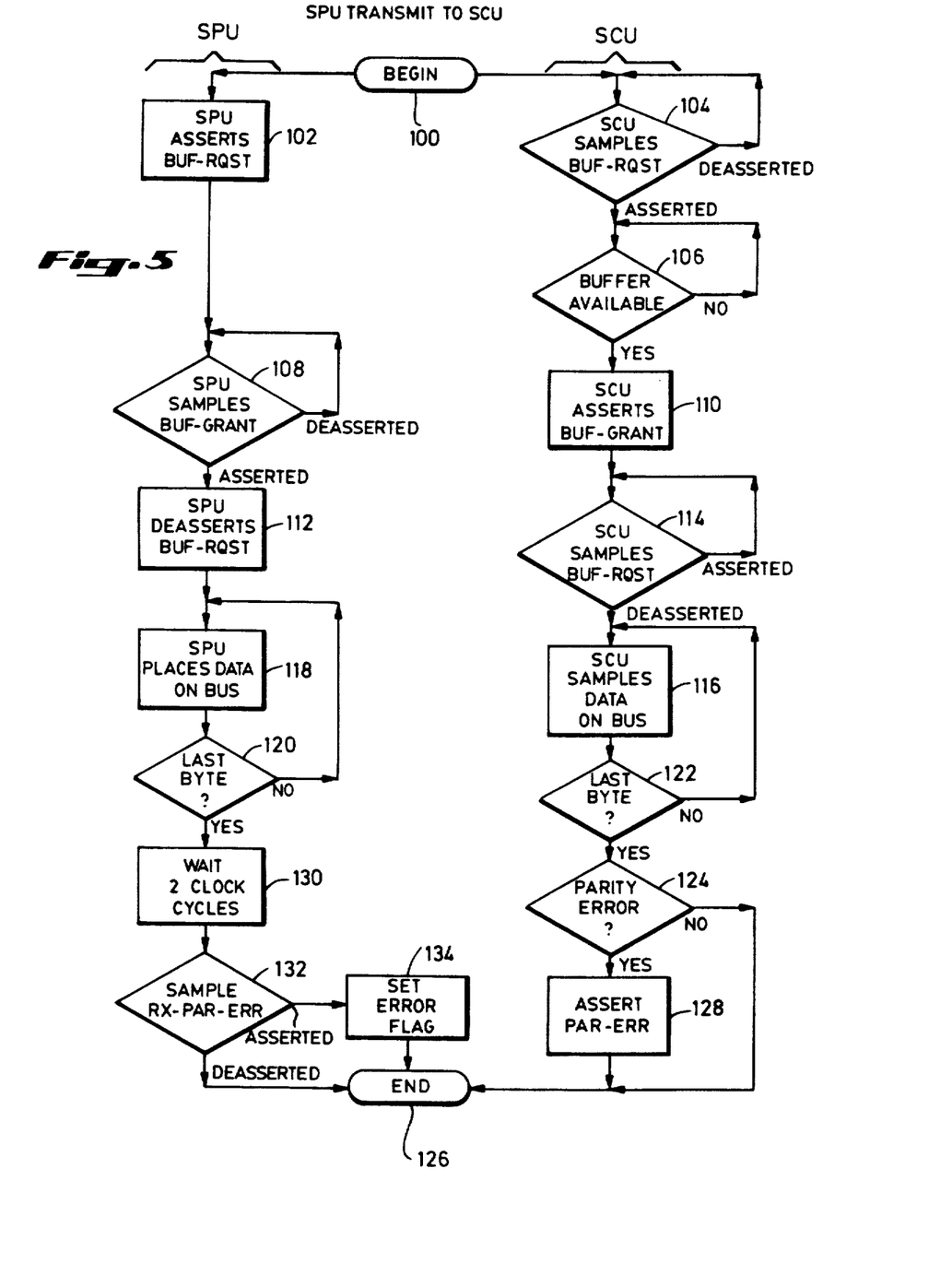
FIG. 5 is a flowchart of the operations performed by the interface in response to a service processing unit transmission to the system control unit.

Referring now to FIG. 5, a more complete understanding of the operation of the SPU to SCU interface and the interaction of the interface signals may be had by reference to the flowchart representing operation of the overall system and, in particular, the state machine 40. In particular, FIG. 5 discloses the logic flowchart for an SPU transmission to the SCU. Operation begins at block 100 and branches in two directions simultaneously. The two branches represent the simultaneous operation of the state machines present in the SPU and the SCU.

At block 102 the SPU begins by asserting its BUFFER REQUEST handshake signal. At the same time in block 104 the SCU is sampling the BUFFER REQUEST line and as long as that BUFFER REQUEST handshake signal is deasserted, control loops back on to itself and can only advance in response to the BUFFER REQUEST signal being asserted. Therefore, since the SPU asserted the BUFFER REQUEST in block 102, control passes from block 104 to block 106 where the SCU determines if its receive buffer is currently available to receive the 14-byte data packet. As long as the buffer remains unavailable control loops back on to itself until such time as the BUFFER is emptied and this empty status is communicated to the SCU state machine.

Concurrently, the SPU samples the BUFFER GRANT handshaking signal and while that BUFFER GRANT signal remains unasserted the control loops back onto itself and can only advance in response to the BUFFER GRANT signal being asserted. Accordingly, in block 108, once the SCU receive buffer becomes available, control passes to block 110 and the BUFFER GRANT handshaking signal is asserted.

Asserting the BUFFER GRANT signal causes control to pass from block 108 to block 112 where the SPU deasserts the BUFFER REQUEST signal that was originally asserted in block 102.

In the SCU, control has passed to block 114 to where the SCU continually samples the BUFFER REQUEST line, and as long as that line remains asserted, the SCU takes no further action. However, when the SPU deasserts the BUFFER REQUEST signal in block 110, the SCU passes control to block 116 and begins sampling data on the bus.

At blocks 118, 120 the SPU consecutively places each byte of data on the bus for fourteen consecutive cycles. During those 14 consecutive cycles the SCU samples data on the bus at block 116. At the end of the 14th clock cycle the control blocks 120, 122 respectively stop the SPU from placing additional data on the bus and prevent the SCU from sampling additional data on the bus.

Thereafter, in block 124, the SCU checks to determine whether the received data is subject to a parity error. If there is no parity error, control transfers to block 126 where the process effectively ends. On the other hand, if a parity error is detected, control transfers to block 128 and the state machine asserts the parity error handshaking signal. Thereafter, control similarly transfers to block 126 where the process ends for the SCU.

In order for the SPU to be certain that the data transferred properly without parity errors, the control routine pauses at block 130 for two clock cycles while the SCU determines if a parity error is detected in block 124. At the end of this two clock cycle period control transfers to block 132 and the SPU samples the parity error handshaking signal line. The two clock cycle delay is sufficient to allow the parity error checking logic to determine if such a parity error exists. Assuming no parity error exists, then control transfers from block 132 to block 126 where the process also ends for the SPU. On the other hand, assuming a parity error is detected by the SCU, the SPU responds by setting an error flag in block 134 and subsequently transferring control to block 126 to end the SPU process. Ultimately, the parity error is communicated back to the SCU.

Figure 6:
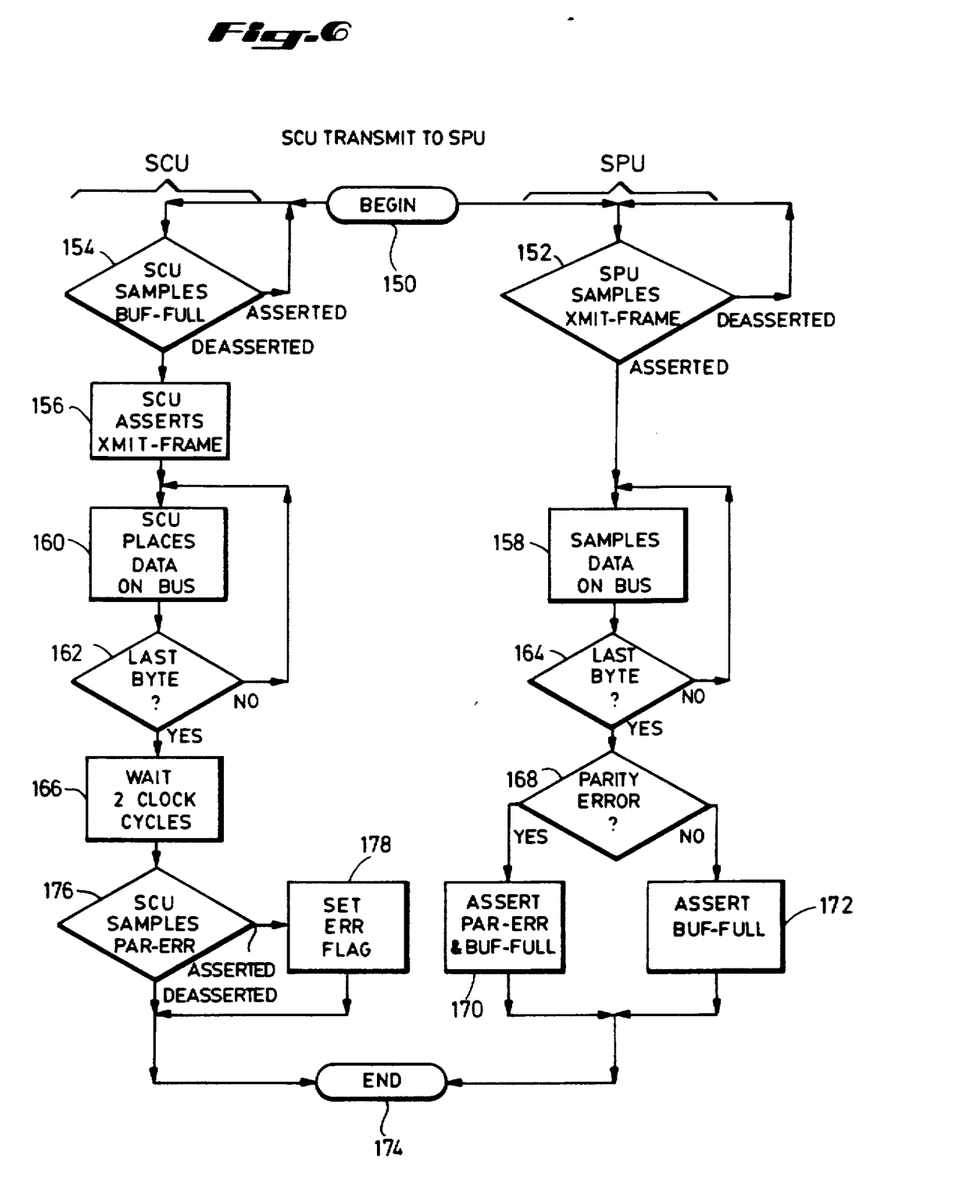
FIG. 6 is a flowchart of the operations performed by the interface in response to a system control unit transmission to a service processing unit.

Referring now to FIG. 6, the operation of the SPU to SCU interface during an SCU transmission to the SPU is shown by way of a flowchart. The process begins at block 150 and like the process describe in conjunction with FIG. 5, control transfers in two directions corresponding to the SCU and SPU operation. In this scenario, the SPU effectively does nothing until the SCU indicates that it is about to send the desired data. At block 152, the SPU simply continually samples the TRANSMIT FRAME handshaking signal and as long as that signal is deasserted control does not pass further. At the same time, the SCU is also waiting until the SPU frees up its receive buffer to receive the desired data packet. At block 154, the SCU samples the BUFFER FULL handshaking signal and as long as that BUFFER FULL signal is asserted, indicating that the SPU BUFFER is currently unavailable, the SCU loops on itself waiting for the BUFFER FULL signal to become deasserted.

Once the SPU frees up its receive buffer and deasserts the BUFFER FULL handshaking signal, control passes to block 156 where the SCU asserts the TRANSMIT FRAME handshaking signal indicating that in the current clock cycle the SCU will begin transmitting the data packet for the next consecutive fourteen cycles. Asserting the TRANSMIT FRAME signal causes control to pass from block 152 to block 158 of the SPU control routine where the SPU begins sampling data on the bus for the next 14 consecutive cycles. Likewise, for the next 14 consecutive cycles the SCU in blocks 160 and 162 consecutively places those 14 blocks on the data bus.

As the 14th and last byte of the data packet is transmitted by the SCU, control respectively passes from blocks 162, 164 to blocks 166, 168 of the SCU and SPU control routines respectively. At block 166, the SCU simply waits for two clock cycles while the SPU, in block 168, checks to determine if a parity error exists in the transmitted packet of data. If a parity error is detected by the SPU, control transfers to block 170 where the PARITY ERROR handshaking signal and the BUFFER FULL signal are asserted. Conversely, the absence of a PARITY ERROR signal causes control of the transfer to block 172 where the SPU asserts the BUFFER FULL signal. In either case, control then transfers to the block 174 where SPU operation effectively ends for this data transfer.

After the two clock cycle wait at block 166, control transfers to block 176 and the SCU immediately samples the PARITY ERROR handshaking signal. If the parity error handshaking signal has been asserted in block 170 then control transfers to block 178 where the error flag is set and control subsequently passes to the block 174 where SCU operation ends for this data transfer. Alternatively, if the parity error signal was not set in block 170, then control passes from block 166 to block 174 where the process ends for the SCU.

We claim:

1. A method for transferring data between a first unit and a second unit of a computer system, comprising the steps of:
    a) asserting a request signal from the first unit to the second unit when the first unit has data to send;
    b) asserting a grant signal from the second unit to the first unit in response to receiving said request signal if said second unit has a buffer able to receive data from the first unit; and
    c) in response to receipt of said grant signal by said first unit, transferring said data from the first unit to the buffer of the second unit in a plurality of following operating cycles of said computer system; and
    transferring data from said second unit to said first unit by the steps of:
    d) asserting a buffer full signal from the first unit to the second unit if a buffer in the first unit is not able to receive data;
    e) asserting a transmit signal from the second unit to the first unit if said buffer full signal is not received by the second unit;
    f) and transferring data from the second unit to said buffer of the first unit in a plurality of following operating cycles of said computer system after receipt of said transmit signal by said first unit.

2. A method according to claim 1 wherein said steps of transferring data from the first unit and from the second unit occur in consecutive machine cycles of the computer system.

3. A method according to claim 1 wherein said transfer of data from the first unit to the second unit is by a first set of unidirectional parallel lines, and said transfer of data from the second unit to the first unit is by a separate second set of unidirectional parallel lines.

4. A method for controlling the flow of data between a receive buffer of a service processing unit and a transmit buffer of a system control unit of a computer system, and between a receive buffer of said system control unit and a transmit buffer of said service processing unit of the computer system, comprising the steps of:
    delivering a buffer full handshaking signal from said service processing unit to said system control unit in response to said service processing unit receive buffer having data contained therein and being unable to receive data;
    delivering a transmit frame handshaking signal from said system control unit to said service processing unit in response to the absence of said buffer full handshaking signal;
    delivering said data from said system control unit transmit buffer to said service processing unit receive buffer in a series of consecutive clock cycles a preselected duration of time after delivering said transmit frame signal;
    delivering a buffer request handshaking signal from said service processing unit to said system control unit;
    delivering a buffer grant handshaking signal from said system control unit to said service processing unit in response to receipt of said buffer request handshaking signal by said system control unit and said system control unit receive buffer being available to receive data; and
    in response to receipt of said buffer grant handshaking signal by said service processing unit, delivering said data from said service processing unit transmit buffer to said system control unit receive buffer in a series of consecutive clock cycles.

5. An interface for controlling the flow of data between a receive buffer of a service processing unit and a transmit buffer of a system control unit of a computer system, and between a receive buffer of said system control unit and a transmit buffer of said service processing unit of the computer system, comprising:
    means for delivering a buffer full handshaking signal from said service processing unit to said system control unit in response to said service processing unit receive buffer having data contained therein and being unable to receive data;
    means for delivering a transmit frame handshaking signal from said system control unit to said service processing unit in response to the absence of said buffer full handshaking signal;

means for delivering said data from said system control unit transmit buffer to said service processing unit receive buffer in a series of consecutive clock cycles;

means responsive to said transmit frame handshaking signal for depositing in said service processing unit receive buffer said data from said system control unit transmit buffer;

means for delivering a buffer request handshaking signal from said service processing unit to said system control unit;

means for delivering a buffer grant handshaking signal from said system control unit to said service processing unit in response to receiving said buffer request handshaking signal and said system control unit receive buffer being available to receive data; and means for delivering said data from said service processing unit transmit buffer to said system control unit receive buffer in a series of consecutive clock cycles.

* * * * *